Patented May 21, 1929.

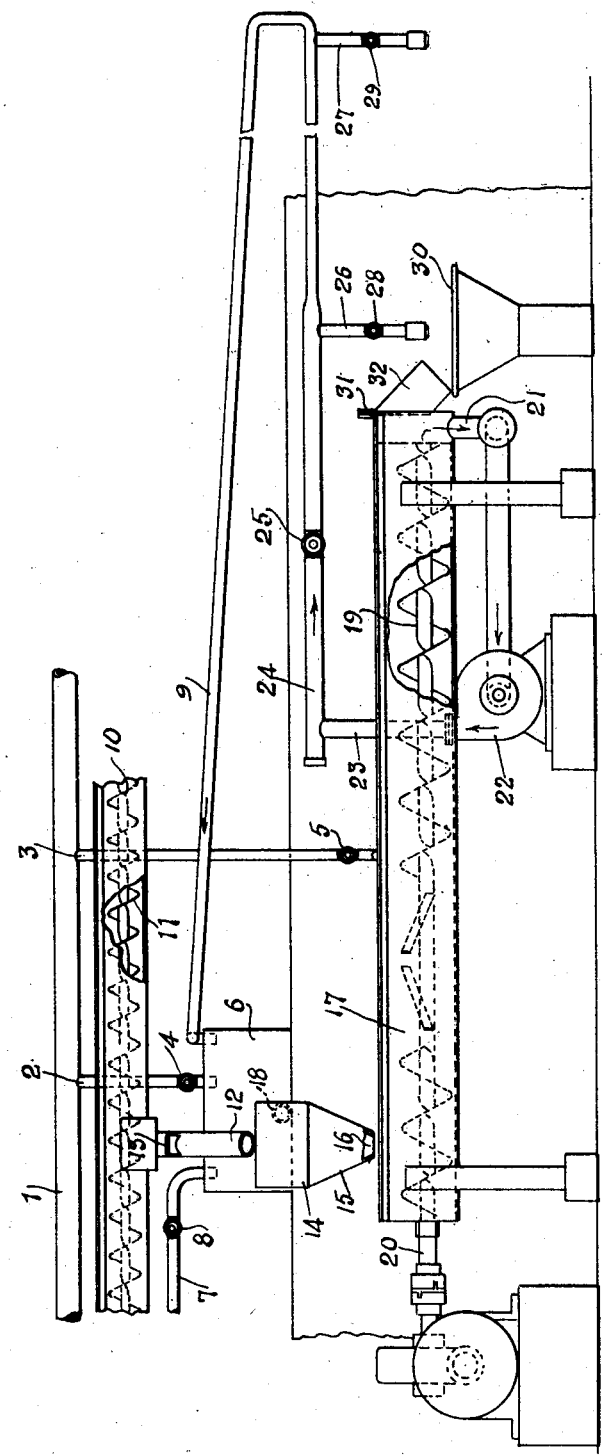

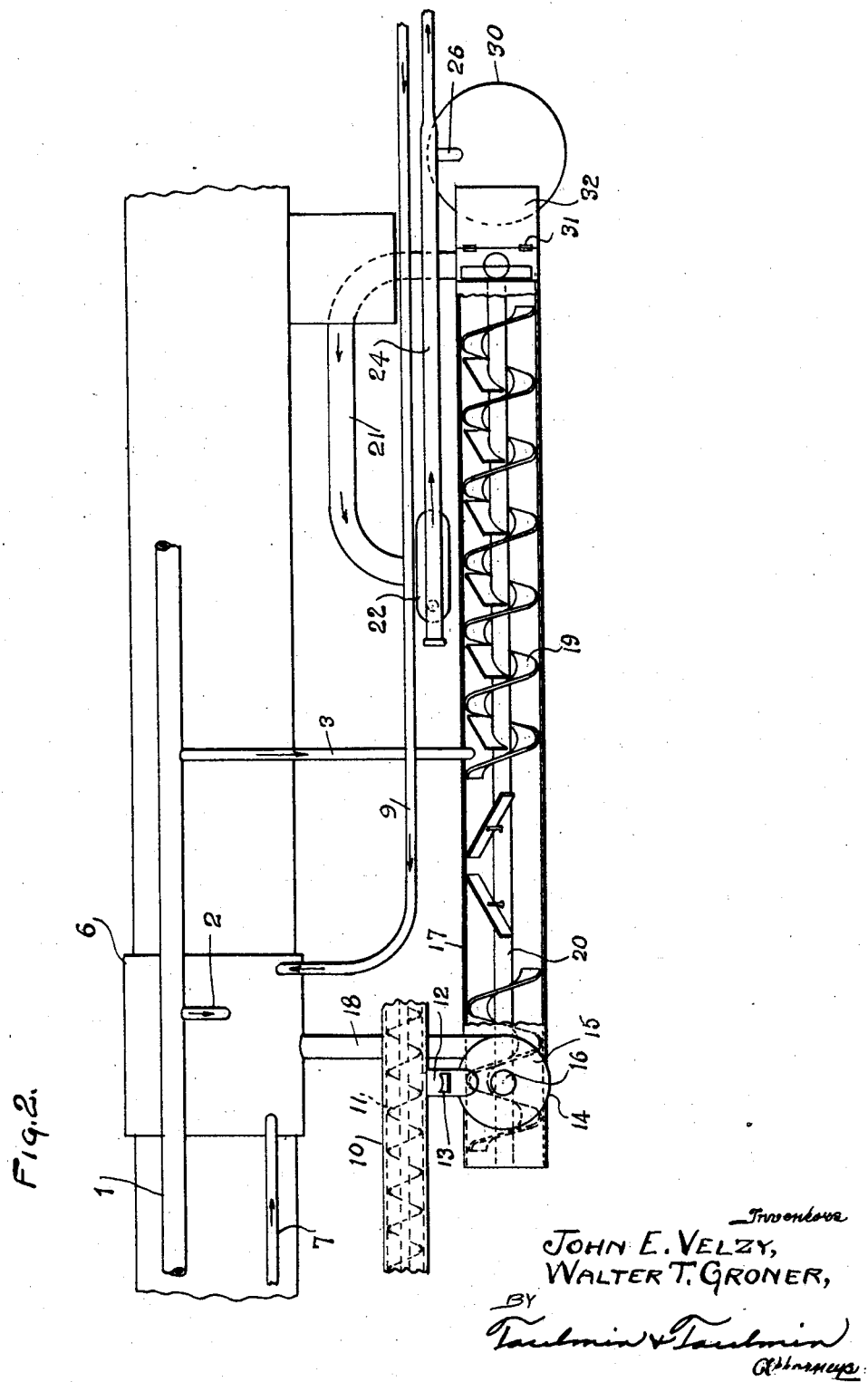

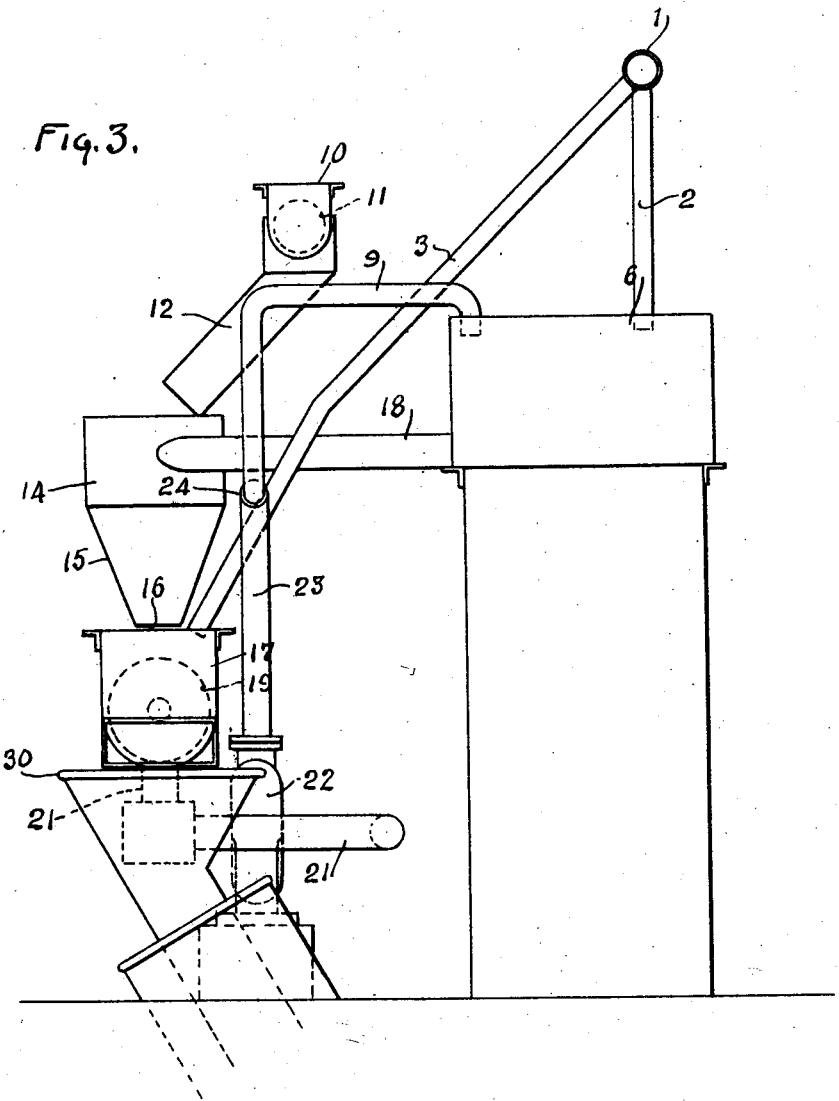

1,714,060

UNITED STATES PATENT OFFICE.

JOHN E. VELZY AND WALTER T. GRONER, OF DAYTON, OHIO, ASSIGNORS TO SOUTHWESTERN PORTLAND CEMENT COMPANY, OF DAYTON, OHIO, A CORPORATION OF DELAWARE.

APPARATUS AND PROCESS FOR MAKING CEMENT.

Application filed April 20, 1928. Serial No. 271,576.

Our invention relates to the making of cement, and, in particular, to a process and apparatus for utilizing waste dust in a cement mill by reintroduction of it into the slurry line.

Referring to the drawings:

Figure 1 is a side elevation of the apparatus embodying our invention;

Figure 2 is a top plan view thereof;

Figure 3 is an end elevation thereof.

Referring to the drawings, 1 indicates a lime slurry line which is adapted to deliver lime slurry through the pipes 2 and 3 which are controlled by the valves 4 and 5. The pipe 2 delivers the lime slurry into the mixing hopper 6. Water is delivered to this hopper through the pipe 7 which is controlled by the valve 8. Unused slurry is returned to this hopper through the return pipe 9.

The trough 10 constitutes the trough for a screw conveyor 11 which delivers the waste dust through the spout 12 controlled by the sliding valve 13 to a centrifugal mixer consisting of a drum 14 and a conical bottom 15 which has its lower end open at 16 discharging into the conveyor 17. There is introduced tangentially of this centrifugal mixer 14 the contents of the mixing hopper 6 through the pipe 18, the screw conveyor 19 in the trough 17 and is operated by a suitable power shaft 20 so that it delivers the mixture to the end of the trough 17 whence the mixture is removed through the pipe 21 by the pump 22 which discharges it through the line 23 into the distribution pipe 24 controlled by the valve 25. This pipe has a number of branches 26 and 27 controlled by the valves 28 and 29 for delivering this mixture to the mill hoppers 30. If desired, the contents of the trough 17 may be directly dumped into the hopper 30 by lifting the gate 31 and permitting the exit of the mixture through the chute 32. The pipe 3 and valve 5 may be dispensed with entirely, if desired.

It will be understood that we desire to comprehend within our invention such modifications as may be necessary to adapt it to varying conditions and uses.

Having thus fully described our invention, what we claim as new and desire to secure by Letters Patent, is:

1. In a process of making cement, delivering lime slurry, mixing the slurry, adding water to the lime slurry in the mixer, mixing centrifugally the slurry with waste dust, whirling the dust and lime slurry, conveying and mixing the mixture as it is delivered to a cement mill.

2. In a process of making cement, delivering and mixing lime slurry, adding water to the lime slurry in the mixing, further mixing the slurry by giving it a centrifugal motion, delivering waste dust to the mixture within the cavity formed by the slurry, whirling the dust and lime slurry, conveying and mixing the mixture and grinding the mixture, and conveying the mixture to effect a delivery as desired, and redelivering the surplus of the mixture for mixture with the lime slurry and water as initially mixed.

3. In a process of making cement, delivering lime slurry for mixing, controlling the water content thereof, delivering the mixture with predetermined water content for mixing with dry waste dust, mixing such slurry and said dry waste dust centrifugally, delivering by gravity in mixed condition, stirring and conveying the mixture and delivering the mixture to a cement mill.

4. In a process of making cement, delivering lime slurry for mixing, controlling the water content thereof, delivering the mixture with predetermined water content for mixing with dry waste dust, mixing such slurry and said dry waste dust centrifugally, delivering by gravity in mixed condition, stirring and conveying the mixture and delivering the mixture to a cement mill by pumping the mixture.

5. In combination, means for delivering lime slurry to a mixing hopper, a mixing hopper, means of adding moisture thereto, means of delivering the mixture to a centrifugal mixer tangentially thereof, means of delivering waste dust thereto, means of conveying and stirring the resulting mixture to cement mills.

6. In combination, means for delivering lime slurry to a mixing hopper, a mixing hopper, means of adding moisture thereto, means of delivering the mixture to a centrifugal mixer tangentially thereof, means of delivering waste dust thereto, means of conveying and stirring the resulting mixture to cement mills, and means for pumping the mixture from the conveyor and stirrer to the cement mills.

7. In combination, means for delivering lime slurry to a mixing hopper, a mixing hopper, means of adding moisture thereto, means of delivering the mixture to a centrifugal mixer tangentially thereof, means of delivering waste dust thereto, means of conveying and stirring the resulting mixture to cement mills, means for pumping the mixture from the conveyor and stirrer to the cement mills, and means for delivering the surplus thereof back to the mixing hopper.

8. In combination, means for delivering lime slurry to a mixing hopper, a mixing hopper, means of adding moisture thereto, means of delivering the mixture to a centrifugal mixer tangentially thereof, means of delivering waste dust thereto, means of conveying and stirring the resulting mixture to cement mills, means for pumping the mixture from the conveyor and stirrer to the cement mills, means for delivering the surplus thereof back to the mixing hopper, and means of delivering the slurry direct to the mixing and conveying means as desired.

9. In combination, a lime slurry, delivery means adapted to deliver its contents by gravity to a mixing hopper, a mixing hopper adapted to deliver by gravity its contents tangentially into a mixing swirl, a dust conveyor adapted to deliver by gravity waste dust into the mixing swirl hopper into the path of the centrifugally moving lime slurry, means to deliver by gravity at the bottom of the mixing swirl the resulting mixture of the slurry and dust into a mixing conveyor, a mixing conveyor adapted to move the mixture to a point adjacent a cement mill and means for delivering the mixture to a cement mill.

10. In combination, a lime slurry, delivery means adapted to deliver its contents by gravity to a mixing hopper, a mixing hopper adapted to deliver by gravity its contents tangentially into a mixing swirl, a dust conveyor adapted to deliver by gravity waste dust into the mixing swirl hopper into the path of the centrifugally moving lime slurry, means to deliver by gravity at the bottom of the mixing swirl the resulting mixture of the slurry and dust into a mixing conveyor, a mixing conveyor adapted to move the mixture to a point adjacent a cement mill and means for delivering the mixture to a cement mill by pumping from the bottom of the mixer and conveyor to points above the cement mill hoppers for delivery thereto by gravity, and means of controlling such delivery.

11. In combination, means for delivering lime slurry by gravity to a mixing hopper at a lower level, means of delivering the contents of the mixing hopper by gravity to a mixing swirl collector at a lower level tangentially thereof, means of delivering by gravity from a dust conveyor dust into said mixing swirl collector in the path of said centrifugally moving slurry therein, and means to deliver the resulting mixture in the collector by gravity into a transversely moving mixing conveyor, and means of delivering from the mixture conveyor the mixture by gravity to a cement mill.

12. In combination, means for delivering lime slurry by gravity to a mixing hopper at a lower level, means of delivering the contents of the mixing hopper by gravity to a mixing swirl collector at a lower level tangentially thereof, means of delivering by gravity from a dust conveyor dust into said mixing swirl collector in the path of said centrifugally moving slurry therein, means to deliver the resulting mixture in the collector by gravity into a transversely moving mixing conveyor, means of delivering from the mixture conveyor the mixture by gravity to a cement mill, and means of effecting such mixture by gravity by pumping from the bottom of the mixing conveyor the mixture to a point above the mill.

In testimony whereof, we affix our signatures.

JOHN E. VELZY.
WALTER T. GRONER.